Sept. 15, 1931.     B. E. TILDEN     1,823,672
PRUNER, FRUIT PICKER, AND WEEDER
Filed Dec. 24, 1928
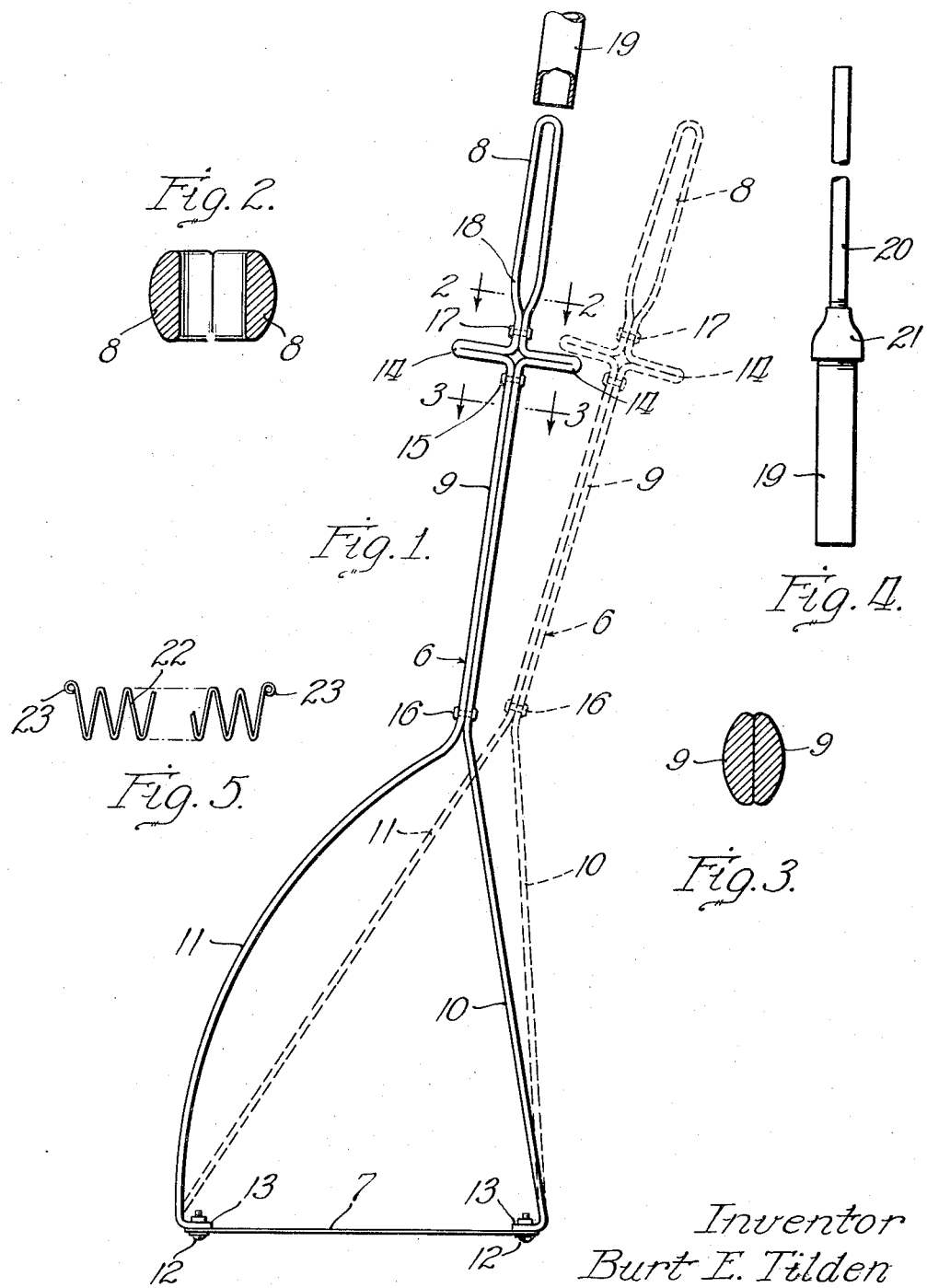
Inventor
Burt E. Tilden
By Brown, Jackson, Boettcher & Dienner
Attys.

Patented Sept. 15, 1931

1,823,672

UNITED STATES PATENT OFFICE

BURT E. TILDEN, OF CHICAGO, ILLINOIS

PRUNER, FRUIT PICKER, AND WEEDER

Application filed December 24, 1928. Serial No. 328,087.

This invention relates to implements designed particularly for use in orchards to prune the trees, to cut grass and weeds, and to pick the fruit. The type of implement with which my invention has to do comprises generally a shank or stem adapted to be held by the operator and provided at its outer end either with a cutting blade disposed approximately at right angles to the stem, or with a similarly disposed rake-like head, the one being adapted to be substituted for the other, depending upon the work to be done. The cutting blade is used for pruning or weed cutting, and the rake head for picking fruit.

In a device of this character it is highly desirable that it be light in weight and inexpensive to manufacture, and it should be so designed that it may be firmly held by the operator without hurting or tiring his hands. It should also be rigid in a plane at right angles to the cutting edge, so that the shank will not bend to an objectionable extent when the implement is used for cutting purposes, and provision should be made for varying the angle of the blade with respect to the shank so that when cutting grass or weeds the implement can be adjusted to accommodate operators of different height or reach.

Furthermore, the implement should be so constructed that the shank may readily be extended to permit the operator to reach the upper branches of trees for pruning and picking purposes. To provide an improved implement that will possess these desirable qualities is the object of my present invention. I accomplish this object as illustrated in the accompanying drawings and hereinafter described. What I regard as new is set forth in the claims.

In the accompanying drawings,—

Fig. 1 is a view illustrating my improved implement in full lines, and showing in dotted lines the manner in which the angle of the cutting blade with reference to the shank may be adjusted;

Fig. 2 is a cross-section on line 2—2 of Fig. 1;

Fig. 3 is a cross-section on line 3—3 of Fig. 1;

Fig. 4 is a view of the shank extension, partly broken away; and

Fig. 5 is a fragmentary view showing the rake-like head substituted for the cutting blade, for fruit picking purposes.

Referring to the drawings, —6 indicates the shank or handle of the implement as an entirety, and 7 the cutting blade. The shank comprises an inner end portion 8, that is slightly tapered toward its end, for a reason that will be set forth later, a straight intermediate portion 9, and two divergent arms 10, 11 that form the outer end portion of the shank and give it the general shape of the letter Y. The blade 7 is secured between the divergent ends of the arms 10, 11, preferably by means of bolts 12 that pass through the end portions of the blade and through flanges 13 formed by bending the ends of the arms 10, 11 approximately at right angles so that they lie parallel with the cutting blade, the ends of which bear against their flat faces.

As shown in Fig. 1, the arm 10 is practically straight, but the arm 11 is bowed outwardly, the purpose of which is to provide for changing the angle of the cutting blade to the main body of the shank, as indicated by dotted lines in said figure. It will be evident from the full line illustration of Fig. 1 that with the arm 11 bowed to the extent illustrated, the cutting blade 7 will be held approximately at right angles to the main body of the shank, but by straightening said arm to a greater or less extent the angularity of the blade to the main body of the shank will be increased, and that when said arm is made substantially straight the parts will assume the position shown in dotted lines in said figure.

Between the inner portion 8 and the intermediate portion 9 of the shank it is provided with two oppositely disposed hand holds 14 of suitable size to be easily gripped by the fingers of one hand of the operator, so that by holding the end portion 8 in one hand and gripping the hand holds 14 in the other, the operator may conveniently manipulate the implement, either to prune trees or to cut grass or weeds. In pruning, the loop formed by the arms 10, 11 and the blade 7 is usually slipped over the limb to be cut off, so that the cutting edge of the blade 7 may engage the limb from above, when by pulling down on the implement it may be severed. Preferably, the cutting blade is double edged, so that either edge can be used. Also, instead of passing the limb through the loop, as above described, the blade may be applied to the limb to be cut from a position at one side thereof. In cutting grass or weeds, the implement is held in the same way, except that it is allowed to hang pendent and is swung back and forth by the operator at the proper distance from the ground, the arm 10 being next to the operator.

A tall man would probably prefer to have the blade set at the angle shown in full lines in Fig. 1, whereas a short man would perhaps prefer to have it set at the angle shown in dotted lines in said figure, in which latter case the desired angle could be obtained by straightening to a greater or less extent the bowed arm 11, since the shank is made of material flexible enough to permit of such adjustment. The change in the angle of the blade may be easily effected by striking one corner of the implement on the ground so as to deflect the blade appropriately.

The shank of the implement is made of a metal bar rounded on one side, as shown in Figs. 2 and 3, the bar being bent approximately midway of its length to form the portions 8, 9 and the two arms 10, 11, the rounded surface, of course, being on the outside. At the intermediate portion 9 the two flat surfaces lie closely in contact with each other and are secured together by rivets 15, 16 adjacent to the ends of such intermediate portions. The free ends of the bar below the pivot 16 are spread apart to form the arms 10, 11, and the extreme ends of such arms are bent toward each other to form the flanges 13. Immediately above the rivet 15 the opposite portions of the bar are bent outwardly at right angles and doubled to form the hand holds 14, and above such hand holds the members of the bar are secured tightly together by the rivet 17. By making the grips in this way their surfaces are rounded so that there are no sharp corners to tire or injure the operator's hands, and consequently he can use the tool more comfortably.

The inner end portion 8 of the shank, by which I mean the portion next to the operator using the tool, is formed by the bight of the bent bar and is in the nature of an elongated loop which is tapered from substantially the point 18 toward the adjacent end of the shank, and also toward the rivet 17. The former taper is quite gentle, and its purpose is to provide for wedging engagement between that end of the shank and an extension handle comprising a short length of pipe 19 of such diameter as to telescope upon the part 8 and make wedging engagement therewith, and a smaller section of pipe or rod 20 connected to the pipe 19 by a reducing coupling 21. By applying this extension handle to the portion 8 of the shank the operator is enabled to reach higher among the branches of the trees, and obviously the extension may easily be removed when not needed. By constructing the extension handle of the parts 19, 20 and 21 it may be made lighter than if a pipe of uniform diameter for its entire length were used to make up the extension. The looping of the part 8 as described makes it somewhat resilient so that it is easier to make a tight connection between the shank and the extension.

By making the shank of a metal bar rounded on one side as described, objectionable corners are eliminated, and the shank may be made stiff enough so that it will not bend laterally, without making it objectionably heavy, or resorting to other expedients such as twisting the bar, to give it the requisite rigidity, which would add to the expense of manufacture. The rounded bar that I propose to use is a common commercial form that may easily be obtained.

Where it is desired to use the implement for picking fruit, the cutting blade 7 is removed and a rake-like head is substituted for it. Such a head is shown in Fig. 5, with its intermediate portion broken away. Preferably said head is made of a wire 22 bent to form teeth or corrugations, and provided at its ends with eyes 23 that may be secured to the flanges 13 by the bolts 12. By hooking these teeth over the fruit it can readily be dislodged so that it will drop into a sack or chute that may be connected with the arms 10, 11, or it may be allowed to drop on the ground.

Instead of securing the cutting blade 7 against the outer faces of the flanges 13, as shown in Fig. 1, it may if desired be secured against the inner faces of said flanges, in which case the flanges will tend to protect the blade from striking the ground when the implement is used for grass or weed cutting.

I claim:

An implement of the character described comprising a metal bar having a rounded surface at one side and a flat surface at the other side, said bar being bent upon itself to form an open loop at the bight in the bar for telescopic engagement with a handle, the opposite sides of the bar at the lower end of the loop being bent out at right angles and doubled to form hand holds at right angles to the handle receiving loop, diverging arms formed by the opposite ends of the bar at the lower end of the implement, an operating member disposed in a plane intersecting the plane of the handle loop and attached at its opposite ends to the lower ends of said diverging arms, said arms being relatively rigid laterally and one of said arms being bendable transversely for adjustment of the angularity of the operating member relative to the handle loop, and an intermediate connecting portion between the upper ends of said diverging arms and the hand holds and formed by securing the flat surfaces of the sides of the bar together along said intermediate connecting portion.

BURT E. TILDEN.